United States Patent [19]
Regan

[11] 3,785,551
[45] Jan. 15, 1974

[54] TAMPER-PROOF ODOMETER
[76] Inventor: Thomas Regan, 4534 43rd Place, N.W., Washington, D.C. 20016
[22] Filed: Nov. 10, 1972
[21] Appl. No.: 305,285

[52] U.S. Cl................. 235/95, 235/96, 235/97, 235/103, 73/490
[51] Int. Cl......................................... G01c 22/00
[58] Field of Search................ 235/95, 96, 97, 103; 73/490

[56] References Cited
UNITED STATES PATENTS

| | | | |
|---|---|---|---|
| 3,516,603 | 6/1970 | Hachtel | 235/95 |
| 3,539,783 | 11/1970 | Bergsma | 235/96 |
| 3,198,430 | 8/1965 | Hermann | 235/95 R |
| 1,394,455 | 10/1921 | Veeder | 235/95 |
| 3,137,444 | 6/1964 | Harada | 235/95 |
| 3,482,773 | 12/1969 | Hachtel | 235/95 |
| 3,495,773 | 3/1970 | Hachtel | 235/96 |

FOREIGN PATENTS OR APPLICATIONS

| | | | |
|---|---|---|---|
| 708,062 | 4/1965 | Canada | 235/95 R |

*Primary Examiner*—Richard B. Wilkinson
*Assistant Examiner*—Vit W. Miska
*Attorney*—Cushman, Darby & Cushman

[57] ABSTRACT

A tamperproof odometer for displaying mileage of an automobile of the type having a plurality of digit wheels driven by gears mounted on gear carrier plates, both gear plates and wheels mounted on a shaft with the plates separating adjacent wheels wherein the shaft is noncircular permitting rotation of the wheels but not the carrier plates, the wheels are prevented from being driven backward to decrement the displayed mileage, both ends of the shaft are terminated in sleeves irremovably fixed to hold the wheels in place and a marker is provided on the largest digit wheel for marking the digits on that wheel as it rotates.

3 Claims, 6 Drawing Figures

PATENTED JAN 15 1974

3,785,551 ously. According to the embodiment of this invention described below,

TAMPER-PROOF ODOMETER

BRIEF DESCRIPTION OF THE PRIOR ART AND SUMMARY OF THE INVENTION

The invention relates to improved tamper-proof odometer of the numbered wheel type generally used on automobiles to record mileage.

Tampering with odometers to reduce the displayed mileage has long been a widespread practice in order to defraud both buyers and sellers of cars. Most of the odometers now in use are comprised of a plurality of plastic digit wheels mounted on a shaft for rotation about that shaft with each connected to adjacent wheels by gears mounted on intervening carrier plates. Each of the gears has a plurality of teeth extending around its periphery on one side and engaging one surface of the gear and at least a single tooth on the other side likewise engaging a gear on the other side, so that for each complete rotation of one digit wheel the next highest digit wheel is rotated a predetermined distance so as to display the next digit. A gear mounted on one end of the shaft associated with the lowest distance drives the wheel at that end to rotate all of the wheels in turn.

In the past, a number of techniques have been used to tamper with the odometer and reduce the displayed mileage. One technique is to simply pick apart the digit wheel with a pointed instrument so that the wheel is momentarily disengaged from the gear and can be easily rotated to display a lesser value. Another technique is to simply rotate the prongs which normally extend from each carrier plate outward of the odometer until a desired mileage is displayed. Yet another technique is simply to rotate the odometer backward to declinate the count displayed. Another approach is to disassemble the odometer, set the wheels to any desired mileage and then to reassemble the odometer and replace it in the speedometer.

A number of approaches have been suggested in the past to prevent tampering with odometers, or at least make tampering as difficult as possible. One technique which has been used involves placing a transparent sleeve over the wheel while it is in place so that a sharp instrument cannot be inserted between the digit wheels. The difficulty with this approach is that it does not prevent tampering with the odometer after it has been removed from the automobile, and such removal is normally an easy task. Another technique which is described in the Hachtel U.S. Pat. No. 3,495,773, is to use a strap which engages the outwardly extending prongs of the carrier plate and prevents rotation of the carrier plates. This technique likewise does not prevent tampering with the odometer after it has been removed from the automobile.

Another technique which prevents rotation of the odometer backward to declinate the count uses a linkage between the driving gear and the first wheel which permits rotation of the first wheel only in one direction. This technique, of course, does not prevent picking the wheel or disassembly for manual rotation or rotating carrier plates.

One other idea which has found some use and acceptance involves placing an ink pad on the 10,000-mile wheel, so that each digit on that wheel is marked with ink as it rotates. If the wheel is turned back it is then readily apparent. The difficulty with this approach is that the ink pad tends to dry out during long use of the automobile, and the ink can normally be removed from the wheel. Further, there is nothing to prevent substitution of the marked wheel following disassembly of the device.

The present invention relates to a tamper-proof odometer of the type described above which incorporates further innovations to make tampering with the device even more difficult than previously. According to the embodiment of this invention described below, the digit wheels and the carrier plates are mounted on a noncircular shaft which has a shape which matches with the passages through the carrier plates so that the carrier plates cannot be rotated with respect to the shaft to effect a change in the displayed count. By making the shaft with a slot or in a hexagonal or other similar shape, the digit wheels can be made to freely rotate about the shaft while the carrier plates and gears are firmly locked in position with respect to the shaft. To prevent driving the odometer backward, the device of this invention is preferably provided with a device such as described in the above mentioned Hachtel U.S. Pat. No. 3,516,603, in which an arrangement is used to prevent backward rotation to preclude disassembly of the device, the noncircular shaft is preferably larger at one end with a sleeve which is irremovably fixed to the other end of the shaft by epoxy or other similar material so that the odometer cannot be disassembled without breakage. As yet another aspect for discouraging and making as difficult as possible tampering with the device, the odometer of this invention is also preferably provided with a marking device in conjunction with the largest wheel for marking that wheel so as to make it as difficult as possible to reduce the count without disclosing an obvious indication of tampering.

Many other objects and purposes of the invention will become clear from the following detailed description of the drawings.

A BRIEF DESCRIPTION OF THE DRAWINGS

DETAILED DESCRIPTION OF THE DRAWINGS

Figure 1:
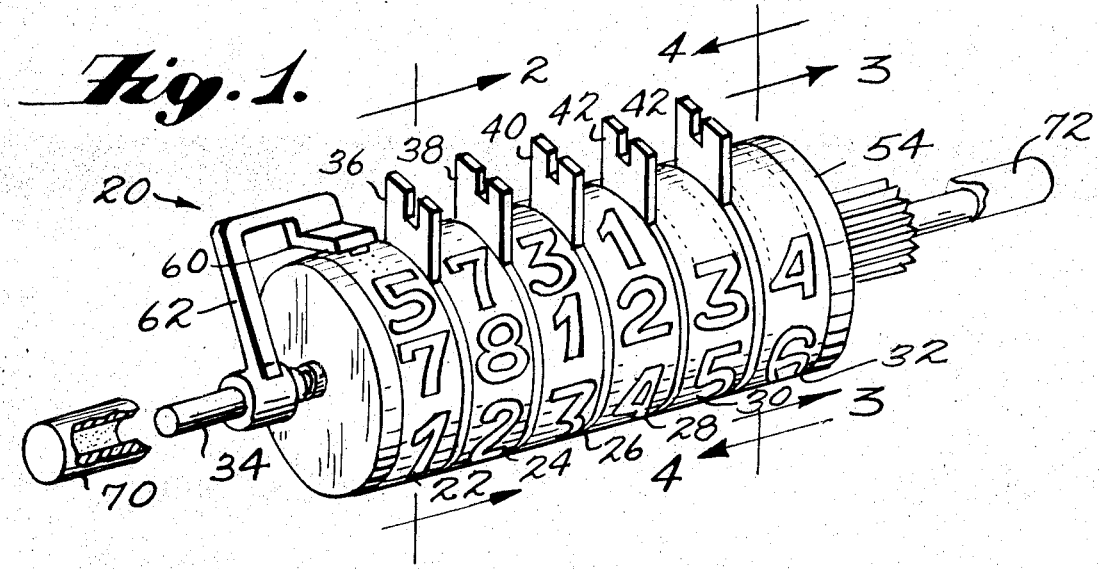
FIG. 1 shows a perspective view of one embodiment of the tamper-proof odometer of this invention.

Reference is now made to FIG. 1 which illustrates one embodiment of the novel odometer of this invention. As discussed briefly above, odometer 20 includes a plurality of digit wheels 22, 24, 26, 28, 30 and 32 which display mileage, for example, of up to 10,000 miles with digit wheel 32 being associated with tenths of miles, digit wheel 30 being associated with miles, digit wheel 28 being associated with tens of miles, etc.

Figures 2, 3, 4:
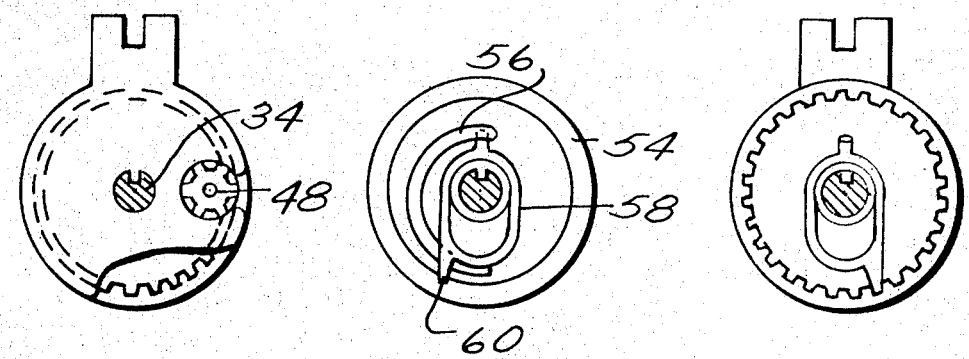
FIG. 2 shows a cut-away view of the odometer of FIG. 1 along the lines 2—2 showing a carrier plate, a gear mounted thereon and digit wheel engaging the gear on the carrier plate.
FIG. 3 shows a view of the embodiment of FIG. 1 along the lines 3—3 illustrating one arrangement for preventing backward rotation of the odometer.
FIG. 4 shows a similar view of the arrangement for preventing backward movement of the odometer along the lines 4—4.

Digit wheels 22, 24, 26, 28, 30 and 32 are mounted for rotation about a noncircular shaft 34 which in the embodiment illustrated in FIG. 1 has a slot cut in it as can be seen, for example, in FIGS. 2–4. The passage through gear wheels 22, 24, 26, 28, 30 and 32 is circular so that these wheels are free to rotate about shaft 34.

Figure 6:
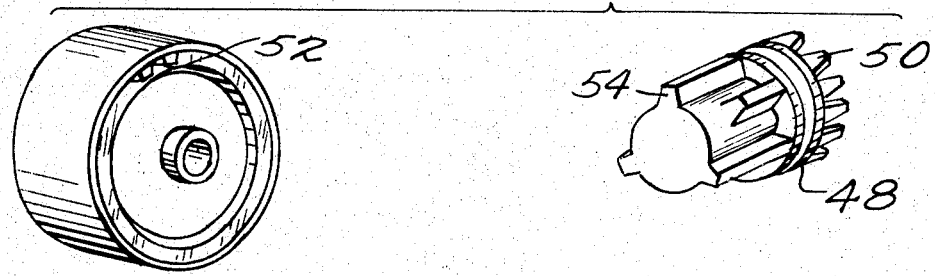
FIG. 6 shows a digit wheel and a gear for engaging it to cause rotation of the digit wheels of the odometer to increment the displayed count.

Digit wheels 22, 24, 26, 28, 30 and 32 are separated by conventional gear carrier plates 36, 38, 40, 42 and 44 with each carrying, as can be seen in FIG. 2, a gear such as gear 48 which is shown in detail in FIG. 6. Gear 48 includes on one side a plurality of teeth indicated as 50 which engage a plurality of teeth located about the periphery of one side of each of the digit wheels 22, 24, 26, 28, 30 and 32. On the other side of each of these digit wheels is a pair of teeth indicated as 52 in FIG. 6 which engage the teeth 54 on gear 48 so that for each complete rotation of an adjacent gear wheel to the right, each gear wheels is rotated a distance which is sufficient to display the next digit. This particular arrangement of carrier plates, digit wheels and gears have been used for many years and are described, for example, in the Hachtel U.S. Pat. No. 3,482,773, the disclosure of which is incorporated herein by reference.

As indicated briefly above, a gear member 54 is provided adjacent the smallest digit wheel 32 and drives that wheel which in turn drives the remainder of the digit wheels. As can be seen in FIGS. 3 and 4, gear member 54 is provided on its inside surface with a groove 56 in which a link member 58 rides as shown. Member 58 is provided at one end with a tab 60 which engages the teeth extending about the periphery of gear wheel 32 on the side adjacent gear member 54. If an attempt is made to rotate gear member 54 backwards, this link member 58 rotates with gear 56 and tab 60 disengages it from the teeth preventing backward rotation of the odometer. This type of mechanism is described further in Hachtel U.S. Pat. No. 3,516,603, the disclosure which is also explicitly incorporated herein by reference. Thus, it is not possible to rotate the odometer shown in FIG. 1 backwards to decrement the displayed count.

As yet another anti-tampering feature of the above invention, a defacing device 60 is attached to the shaft 34 by an arm 62 and engages wheel 22, which is the 10,000-mile wheel, to mark that wheel as it is rotated so that if the wheel is rotated backwards or rotated through more than a single rotation, the digits will readily show tampering.

In yet another anti-tampering feature, sleeve 70 is provided on the end of shaft 30 of FIG. 4 adjacent wheel 22 and is fixed irremovably in place, for example, by epoxy or the like so that the odometer must be broken before the sleeves can be removed. Similarly, gear member 54 on the opposite end of shaft 34 is likewise preferably fixed irremovably in place by a second sleeve 72 which is similar. Sleeve 70 and 72 may be made of any suitable material such as plastic or the like.

Figure 5:
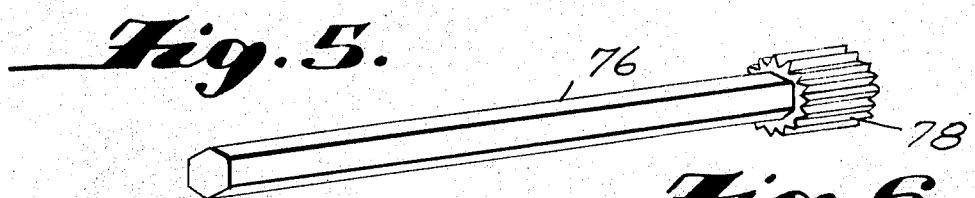
FIG. 5 shows an alternative embodiment of the invention with a hexagonally shaped shaft.

It is not necessary that the shaft 32 be made in the exact configuration shown in FIG. 1 with a key. Alternately the shaft can be made of any shaft which permits free rotation of the digit wheels while preventing rotation of the similarly shaped carrier plates. FIG. 5 illustrates a further shaft 76 having a gear member 78 on one end. Shaft 76 has a hexagonally shaped cross-sectional area.

Many changes and modifications of the above described embodiments of the invention can be, of course, made without departing from the scope thereof. Accordingly, that scope is intended to be limited only by the scope of the appended claims.

What is claimed is:

1. An odometer comprising:
   a shaft having a noncircular cross section and a slot along its axis,
   a plurality of digit wheels mounted in a group on said shaft for rotation to display a count and each having an outer digit displaying peripheral surface, recessed surfaces bounding both sides of said outer surface with a plurality of gear engaging teeth extending around the periphery of one of said recessed surfaces and at least a single gear engaging tooth on the periphery of the other recessed surface,
   a plurality of gear carrier plates each having a tab extending into said slot of said shaft for mounting said plates on said shaft and locking said plates on said shaft with each plate disposed between an adjacent pair of digit wheels and each engaging said shaft so as to be non-rotatable about said shaft,
   a plurality of gears each mounted on one of said carrier plates for engaging both said teeth extending around the periphery of said one recessed surface of one of said pair of wheels and said at least one tooth on the periphery of the other recessed surface of the other of said pair of wheels so as to cause said other of said pair of wheels to advance a predetermined distance less than a complete rotation for each rotation of said one of said pair of wheels, and
   gears means fixedly mounted on said shaft engaging a digit wheel at one end of said group of digit wheels on said shaft for engaging and rotating that digit wheel so as to rotate each digit wheel a predetermined distance for each rotation of the digit wheel adjacent to it,
   means associated with said digit at one end of said group of digit wheels for preventing rotation of that digit wheel in one direction so as to prevent the displayed count from being decremented,
   marking means engaging the digit wheel at the other end of said group of digit wheels for marking that wheel as it is rotated so that the digits displayed on that wheel are visually differentiable after a single rotation thereof, and
   means fixedly attached to the ends of said shaft for preventing removal of said digit wheels.

2. An odometer as in claim 1 wherein said shaft has a plurality of flat surfaces defining its periphery.

3. An odometer as in claim 1 wherein said marking means includes an ink pad.

* * * * *